United States Patent [19]

Utsumi

[11] 4,384,915
[45] May 24, 1983

[54] APPARATUS FOR HEAT-ATTACHING ARTICLES IN A PRODUCTION LINE

[75] Inventor: Yoshikazu Utsumi, Kyoto, Japan

[73] Assignee: Tetra Pak International Aktiebolag, Lund, Sweden

[21] Appl. No.: 235,091

[22] Filed: Feb. 17, 1981

[30] Foreign Application Priority Data

Feb. 22, 1980 [JP] Japan ................... 55/21996

[51] Int. Cl.³ .............................................. B32B 31/00
[52] U.S. Cl. ...................... 156/499; 83/151;
156/70; 156/521; 156/566; 198/655; 206/460;
206/495; 493/379; 493/383
[58] Field of Search ................ 83/151; 156/499, 566,
156/70, DIG. 36, 521; 198/655; 206/495, 460,
229; 493/210, 379, 383

[56] References Cited

U.S. PATENT DOCUMENTS

| | | | |
|---|---|---|---|
| 2,013,475 | 9/1935 | Orton | 206/229 |
| 2,435,267 | 2/1948 | Cahn | 156/321 |
| 3,440,116 | 4/1969 | Whitecar | 156/70 |
| 3,461,647 | 8/1969 | Haines | 198/655 X |
| 4,233,331 | 11/1980 | Lemke et al. | 156/521 X |
| 4,293,369 | 10/1981 | Dilot et al. | 156/521 |

Primary Examiner—Robert A. Dawson
Attorney, Agent, or Firm—Amster, Rothstein & Engelberg

[57] ABSTRACT

A cam operated gripper driven by an endless chain receives at a feed station a wrapped straw having a heat-bondable portion and carries the straw to a bonding section. The gripper is associated with an electric heater which is in contact with the gripped straw. In the bonding section, an electric power supply rail is provided so that a collector of the heater slides on the rail, energizing the electric heater to heat the heat-bondable portion of the wrapped straw. In the bonding section, the heater is also pressed against the carton travelling in a production line at the same speed as the moving speed of the heater with the heat-bondable portion of the wrapped film therebetween. Thus one film wrapper is heat-bonded to each carton. After the completion of bonding, the cam operated gripper releases the straw allowing the straw to remain attached on the carton.

4 Claims, 5 Drawing Figures

APPARATUS FOR HEAT-ATTACHING ARTICLES IN A PRODUCTION LINE

BACKGROUND OF THE INVENTION

This invention relates to apparatuses for heat-bonding articles in a production line and, more particularly, to apparatuses for attaching a first article having a relatively thin heat-bondable portion to each of second articles travelling in a production line.

In certain production lines, such as a milk carton production line, it is often desired that a wrapped drinking straw be attached to each milk carton so that a straw is provided together with the individual milk carton. Drinking straws are wrapped between two plastic films heat-welded together at their edges. Such wrapped straws usually come in a continuous strip-like dispenser sheet made by inserting straws between two strip-like plastic films with a substantially equal spacing therebetween, the straws being disposed in the transverse direction of the plastic films and substantially in parallel with each other. The plastic films between the straws are heated and bonded together so that each straw is wrapped individually. By separating or severing the welded films at the bonded portion, the individual straws are provided in the wrapped state. The welded portion of the films are heat-bondable, so that by pressing the film while applying heat thereto to a carton the wrapped straws can be easily attached to the carton.

Accordingly, it is desirable to provide an apparatus capable of heat-bonding an article having a portion that is heat-bondable, such as drinking straws wrapped in a plastic film wrapper, to other articles such as milk cartons travelling in a production line.

SUMMARY OF THE INVENTION

An object of the present invention is to provide an apparatus for attaching a first article having a relatively thin heat-bondable portion to each of second articles travelling in a production line.

Another object of the present invention is to provide an apparatus for attaching articles together in a production line without stopping the line.

Still another object of the present invention is to provide a simple and reliable apparatus for attaching articles together in a moving production line.

With the above objects in view, the present invention resides in an apparatus for attaching a first article, such as a wrapped drinking straw having a relatively thin heat-bondable portion, to second articles such as milk cartons travelling in a production line, the apparatus comprising holder means which may be a gripper for holding the first article and means for moving the holder means along a closed loop including a bonding section parallel to the line in synchronization with the movement of the production line so that the holder means may provide one straw on each of the cartons. The apparatus also comprises heater means connected to and movable together with the holder means. The heater means heats the heat-bonding portion of the straw wrapper film while the straw is held in the holder means. To press the heater and the bonding portion of the wrapper film against the carton, means for providing a contact pressure is provided. The pressing means provides the contact pressure only when the wrapped straws are in the bonding section of the closed loop. The heater means is electrically energized by a power source through a collector only when the heater means is in the bonding section. The apparatus also comprises actuating means for actuating the holder means to release the wrapped straw bonded to the carton. The actuating means is disposed on the downstream side of the bonding section of the loop in the direction of line movement.

BRIEF DESCRIPTION OF THE DRAWINGS

The invention will become more readily apparent from the following description of the preferred embodiment thereof taken in conjunction with the accompanying drawings, in which.

DESCRIPTION OF THE PREFERRED EMBODIMENT

Figure 1:
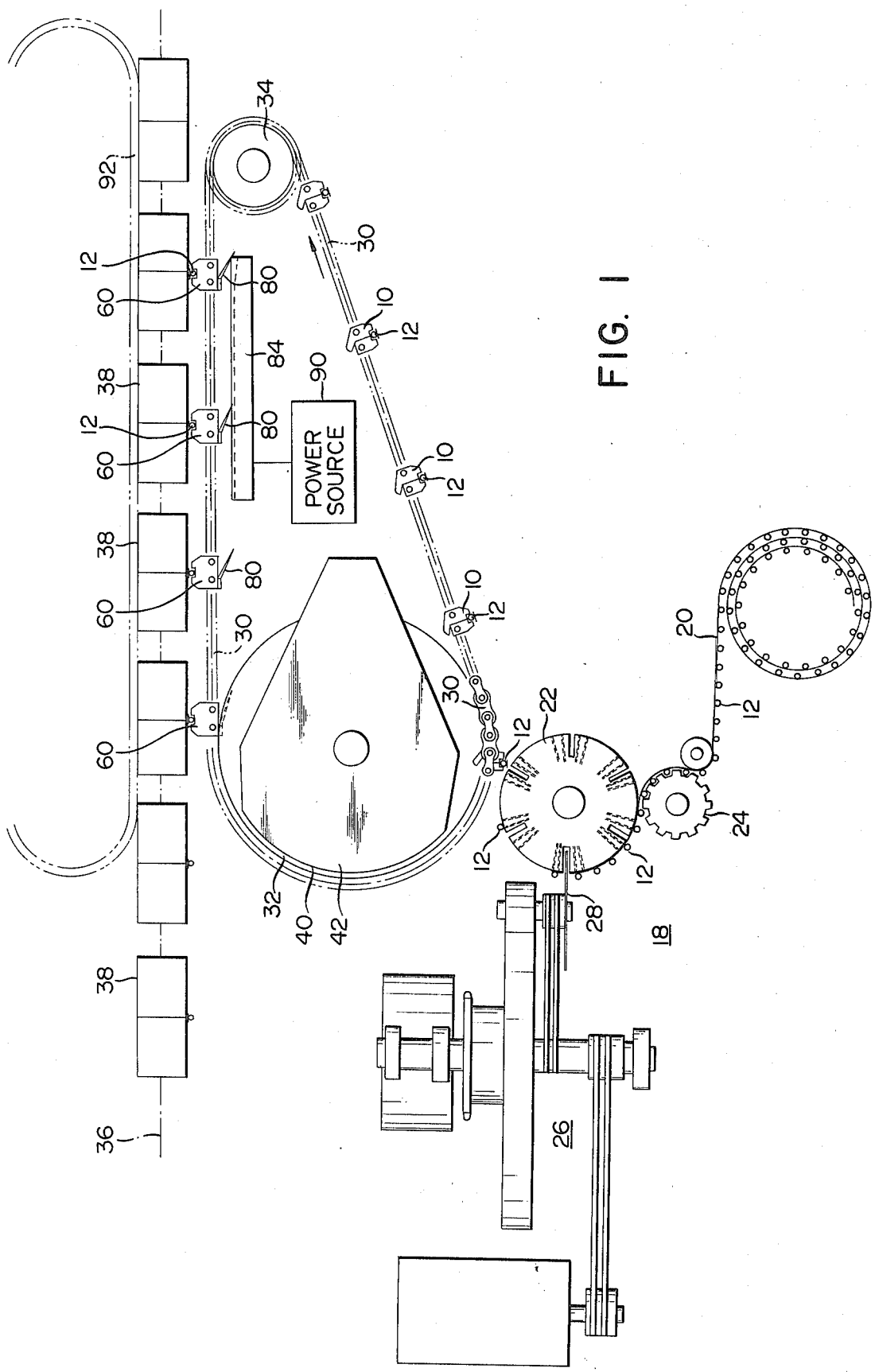
FIG. 1 is a schematic view of the attaching apparatus of the present invention.
Figure 2:
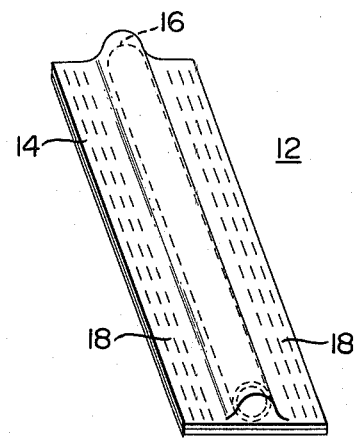
FIG. 2 is a perspective view of a wrapped straw which is an example of the first article to be heat-bonded.

Referring now to the drawings and in particular to FIG. 1 thereof, the apparatus of the present invention comprises holder means 10 for holding first articles 12, which are wrapped straws in the illustrated embodiment. As shown in FIG. 2, the wrapped straw 12 may comprise a plastic film wrapper 14 containing therein a drinking straw 16 and having welded portions forming relatively thin heat-bonding portions 18. It is to be noted that the film wrapper 14 is substantially flat at one side and is provided at the other side with a lengthwise projection for housing the straw 16 therein. This elongated projection or the straw 16 therein can be grasped and held by the holder means 10 which will be described in more detail later.

The wrapped articles 12 may be supplied to the attaching apparatus of the present invention in any suitable manner, but in the illustrated embodiment the wrapped straws 12 are supplied by a separating and feeding apparatus 18 which separates individual wrapped straws 12 from a continuous strip-like dispenser sheet 20 and feeds the separated straws 12 at a spacing greater than that between the straws 12 disposed and contained in the dispenser sheet 20. The illustrated separating and feeding apparatus 18 is of the same type as disclosed in detail in the copending U.S. patent application Ser. No. 235,088 filed on Feb. 17, 1981, now U.S. Pat. No. 4,362,075 and assigned to the same assignee as the present application.

For the complete understanding of the present invention, it is sufficient to say that the separating and feeding apparatus comprises a cutter rotor 22 on which the continuous dispenser sheet 20 is fed by means of a feed roller 24, and a cutter mechanism 26 having a rotary cutter 28, and that the dispenser sheet 20 fed on the cutter rotor 22 is separated by the cutter 28 when the rotation of the cutter rotor 22 and the dispenser sheet 20 is interrupted, the separated wrapped articles 12 being carried a greater distance by the next rotation of the cutter rotor 22. The cutter rotor 22 is provided with a suction means for holding the dispenser sheet 20 and the separated wrapped straws 12 on the cutter rotor 22.

The wrapped straws 12 thus fed by the separating and feeding apparatus 18 are then picked up or removed from the cutter rotor 22 by the holder means, which may be grippers 10 of the apparatus of the present invention. The grippers 10 are attached to and moved by moving means which may be an endless chain 30 with a substantially equal predetermined spacing therebetween. The chain 30 is wrapped around a first sprocket 32 and a second sprocket 34 driven by a suitable drive mechanism (not shown) in synchronization with the feeding mechanism 18 so as to enable the grippers 10 to receive the wrapped straws 12 fed by the feeding mechanism 18. Thus, the endless chain 30 forms a closed loop along which the grippers 10 are moved. The loop includes an upper run which is a section in which the grippers 10 travel in the same direction as production line 36 along which second articles 38 such as milk cartons travel in a train with a substantially equal predetermined spacing therebetween. This section is referred to as a bonding section because the bonding operation is achieved within this section of the loop. The spacing between the grippers 10 and the spacing between the cartons 38 are selected so that one straw 12 is provided on each of the cartons 38, and the moving speeds of the grippers 10 and the cartons 38 are the same. The closed loop also includes an arcuated section downstream of the bonding section and extending along the periphery of the sprocket 32 and along a curved cam surface 40 of the cam member 42, the cam surface 40 being in parallel to the loop path section.

Figure 3:
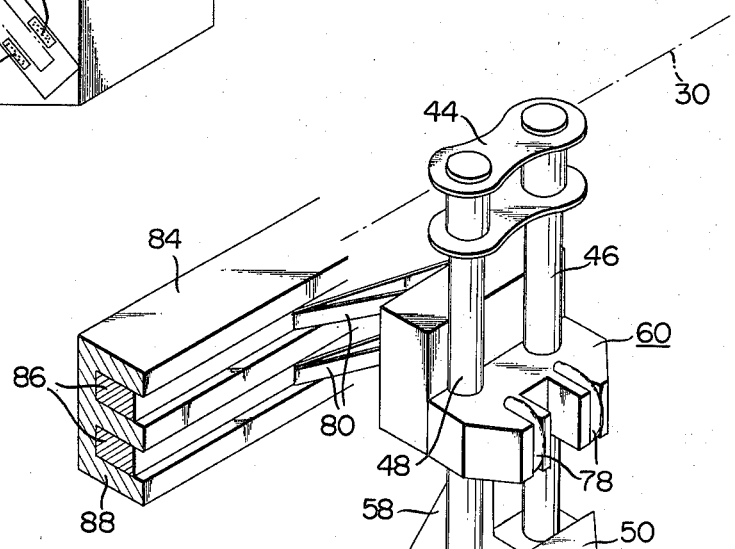
FIG. 3 is a partial perspective view of the gripper and the heaters mounted on the endless chain.

The endless chain 30 is comprised of two parallel chains as best shown in FIG. 3 in which only one of chain link pairs 44 to which the grippers 12 are attached is shown for each chain. Between two link pairs 44, first and second elongated parallel rods 46 and 48 extend coaxially with respective pins between the chain links forming the link pairs 44 and connected at their ends to the link pairs 44. At an intermediate location between the ends of the rods 46, 48, a gripper 10 is mounted. The gripper 10 comprises a stationary member 50 secured to the first rod 46 and having a jaw 52, and a movable member 54 rotatably but axially immovably mounted on the second rod 48, the movable member 54 also having a jaw 56 opposing the jaw 52 of the stationary member 54 to form openable jaws which grip the wrapped straws 12 at their projections containing the straws 16. The movable members 54 also has a biasing spring (not shown) for biasing the jaw 56 of the movable member 54 toward the jaw 52 of the stationary member 50 so that the jaws 52 and 56 are usually biased in the closed position. The movable member 54 further includes a cam lever 58 extending in the generally opposite direction of the jaws 52 and 56 to actuate the movable member 54 to open when the cam lever 58 engages the cam surface 40 of the cam member 42 shown in FIG. 1. When the cam lever 58 engages the cam surface 40 to jaws 52 and 56 open and the jaws, and when the lever 58 disengages from the cam surface 40 it is gripper between the jaws 52 and 56 by the action of the biasing spring. As the gripper 10 moves along the loop path, the gripped straw 12 is removed from the cutter rotor 22 of the feed mechanism 18 and carried to the bonding section of the loop path.

Figure 4:
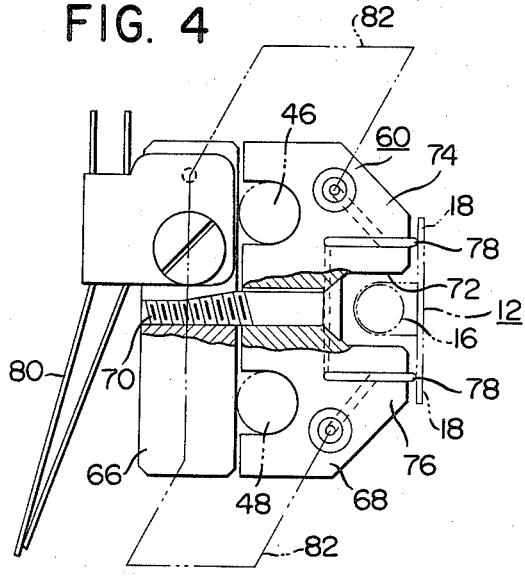
FIG. 4 is a partial sectional view of the first heater.

Referring back to FIG. 3, the parallel support rod 46 and 48 also have mounted thereon heater means for heating the heat-bonding portion 18 (FIG. 2) of the wrapped straw 12. The heater means comprises a first heater 60 mounted on the support rods 46 and 48 between the upper ends of the rods and the gripper 10 and a second heater 62 mounted on the support rods 46 and 48 between the lower ends and the gripper 10. As best shown in FIG. 4, the first heater 60 comprises a support base 64 secured to the support rods 46 and 48 by clamping the rods between first and second blocks 66 and 68, respectively. The blocks 66 and 68 are connected together by means of a screw 70. The second block 68 has formed therein a U-shaped channel or groove 72 and two projections 74 and 76 defining the groove 72 therebetween. The projections 74 and 76 each has mounted thereon a resistance heater element 78 the two elements being connected in series with each other. In the illustrated embodiment, the heater element 78 is a single sheathed element having terminals on the second block 68. The first block 66 has mounted thereon a pair of collectors 80 made of electrically conductive leaf springs. The lower or second heater 62 is of similar construction except that the second heater 62 is provided with no collectors. The heater element 78 on the second heater 62 is electrically connected by unillustrated leads in parallel or in series with the heater element 78 of the first heater 60, and the heater element 78 of the first heater 60 is electrically connected by conductors 82 to the collectors 80. In series connection, the electric path may extend from one of the collectors 80 to the other through the conductor 82, the heater element 78 of the first heater 60, the lead between the heaters 60 and 62, the heater element 78 of the second heater 62, the other lead between the second heater 62 and the other collector 80. In parallel arrangement, one of the current paths may extend from one of the collectors 80 through the conductor 82, the heater element 78 of the first heater 60 and the other conductor 82 to the other of the collectors 80, and the other current path includes the leads connected to the terminals of the heater element 78 of the second heater 62, the leads being connected to the collectors 80 either directly or through the conductors 82.

In order to electrically energize the heater elements 78 of the first and the second heaters 60 and 62, means is provided for energizing the heater elements 78 while the heaters 60 and 62 are in the bonding section of the closed loop. The energizing means comprises a power supply rail 84 disposed along the bonding section of the loop over a predetermined distance. The power supply rail 84 includes two parallel conductor rails 86 supported by an insulating member 88. The conductor rails 86 are electrically connected to a power source 90.

In operation, when the wrapped 12 is held between the jaws 52 and 56 of the gripper 10, the elongated projection or the straw 16 is received within the U-shaped groove 72 of the first and the second heaters 60 and 62, with the bonding portions 18 of the wrapper 14 in contact with the heater elements 78 of the first and the second heaters 60 and 62. When the heaters 60 and 62 enter into the bonding section of the loop, the resilient collectors 80 come into pressure contact with the power supply rails 86, and the straw 12 held by the gripper 10 is brought into pressure contact with the carton 38 in the production line 36 because of the tension in the endless chain 30 and the tension in the production line 36 and also because of the spring action of the resilient collectors 80. In order to ensure that a greater pressure is obtained between the heaters and the carton, a guide 92 may be provided along the production line 36.

While the collectors 80 are in contact with and slide on the conductor rails 86, the heater elements 78 of the first and the second heaters 60 and 62 are energized to heat and weld the bonding portion 18 of the wrapper 14 onto the carton. After the welding operation has been completed the cam lever 58 of the gripper 10 comes in contact with the cam surface 40 of the cam member 42 to open the jaw of the gripper to release the straw 12 allowing the welded wrapped straw 12 to remain on the carton 38. The gripper 10 in the open position is further moved to the wrapped straw receiving section to again receive and hold the straw for the subsequent bonding operation.

Figure 5:
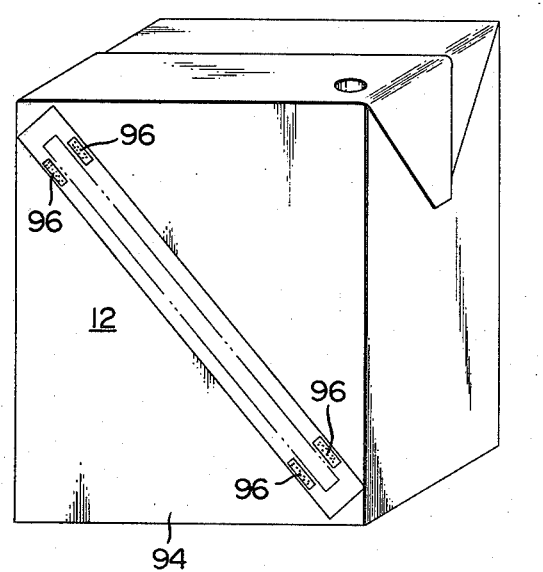
FIG. 5 is a perspective view of a milk carton with a wrapped straw attached by the apparatus of the present invention.

FIG. 5 illustrates an example of the first and the second articles heat-bonded together by the heat-bonding apparatus of the present invention. The illustrated example is a conventional rectangular milk carton 94 having bonded on one face thereof a wrapped straw 12. It is seen that the wrapped straw 12 is diagonally oriented and heat-bonded at four points 96 on the bonding portion 18 of the wrapper 14, the four points 96 corresponding to the sections of the heater elements 78 of the projections 74 and 76 of the first and the second heaters 60 and 62. The diagonal orientation of the straw 12 may be achieved by tilting the carton in the production line.

Although the present invention has been described in connection with an exemplary embodiment, many changes and modifications may be applied without departing from the scope and spirit of the present invention. For example, the articles may be any heat-bondable article and is not limited to wrapped straws. Also a heat-sensitive bonding agent may be used instead of welding.

What is claimed is:

1. An apparatus for attaching a first article having a relatively thin heat-bondable portion to each of second articles traveling in a production line, comprising:
   holder means for holding the first article; means for moving said holder means along a closed loop including a bonding section extending along a continuous portion of the production line in parallel thereto, said moving means driving said holder means in synchronization with movement of the production line, enabling said holder means to provide one first article on each of the second articles;
   heater means connected to and movable with said holder means for applying heat to the first article to raise the relatively thin heat-bonding portion of the first article held by said holder means to its bonding temperature;
   means for providing a contact pressure between said heater means, the heat-bonding portion and the second article while the first article held by said holder means moves within said bonding section;
   means for energizing said heater means only while said heater means is within said bonding section; and
   means disposed downstream of the bonding section of said loop in the direction of line movement for actuating said holder means to release the first article therefrom.

2. An apparatus for attaching articles as claimed in claim 1, wherein said heater means comprises a support base attached to said holder means and having a recess for receiving therein the first article, an electric heater supported in said support base and capable of contacting the relatively thin heat-bonding portion of the first article, and a current collector supported on said support base, and said energizing means comprises an electric power source and a power supply rail connected to said power source and disposed along said bonding section of the loop for a distance sufficient for the heat-bonding of the first article to the second article.

3. An apparatus for attaching articles as claimed in claim 1 or 2, wherein said moving means comprises at least two sprockets at least one of which is connected to a drive, an endless chain wound around said sprockets to form said closed loop, said endless chain having mounted thereon said holder means and said heater means.

4. An apparatus for attaching articles as claimed in claim 1 or 2, wherein said holder means comprises a gripper including a pair of relatively movable members having openable jaws, a biasing spring biasing said jaws to the closed position, and a cam lever for opening and closing said jaws, and wherein said apparatus further comprises cam means for engaging and actuating said cam lever to open said jaws.

* * * * *